(12) United States Patent
Diver

(10) Patent No.: US 7,667,833 B1
(45) Date of Patent: Feb. 23, 2010

(54) ALIGNMENT METHOD FOR PARABOLIC TROUGH SOLAR CONCENTRATORS

(75) Inventor: Richard B. Diver, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 420 days.

(21) Appl. No.: 11/761,396

(22) Filed: Jun. 12, 2007

Related U.S. Application Data

(60) Provisional application No. 60/817,160, filed on Jun. 28, 2006.

(51) Int. Cl.
G01B 11/26 (2006.01)
(52) U.S. Cl. ...................................... 356/138
(58) Field of Classification Search ............... 356/152.2, 356/138; 136/246; 126/602; 372/9
See application file for complete search history.

(56) References Cited

U.S. PATENT DOCUMENTS

| | | | | |
|---|---|---|---|---|
| 4,242,580 A | * | 12/1980 | Kaplow et al. | 250/203.4 |
| 5,269,288 A | * | 12/1993 | Stirbl et al. | 126/593 |
| 5,982,481 A | * | 11/1999 | Stone et al. | 356/152.2 |
| 6,225,551 B1 | * | 5/2001 | Lewandowski et al. | 136/246 |
| 6,597,709 B1 | | 7/2003 | Diver, Jr. | |
| 7,569,764 B2 | * | 8/2009 | Shan et al. | 136/246 |

OTHER PUBLICATIONS

Richard L Wood, "Distant Observer Techniques for Verification of Solar Concentrator Optical Geometry", Solar Energy Research Institute, 1981, UCRL-53220.

M.K. Selcuk, "Parabolic Dish Test Site: History and Operating Experience", Prepared for USDOE through NASA by Jet Propulsion Laboratory, JPL Publication 85-18. Feb. 15, 1985.

F. R. Livingston, "Activity and Accomplishments in Dish/Stirling electric Power System Development," Prepared for USDOE through NASA by Jet Propulsion Laboratory, JPL Publication 85-8. Feb. 15, 1985.

T. Wendelin, "Parabolic Trough Optical Characterization at the National Renewable Energy Laboratory," DOE/Solar Program Review Meeting, 2004, DOE/GO-102055-2067, pp. 328-329.

Eckhard Lupfert et al, "Parabolic Trough Analysis and Enhancement Techniques," Proceedings of ISEC2005, 2005 International Solar Energy Conference, Orlando, FL, pp. 1-7.

Hank Price et al, "Advances in Parabolic Trough Solar Power Technology," Journal of Solar Energy Engineering, May 2002 vol. 124 pp. 109-125.

(Continued)

*Primary Examiner*—Tarifur R. Chowdhury
*Assistant Examiner*—Isiaka O Akanbi
(74) *Attorney, Agent, or Firm*—Kevin W. Bieg

(57) ABSTRACT

A Theoretical Overlay Photographic (TOP) alignment method uses the overlay of a theoretical projected image of a perfectly aligned concentrator on a photographic image of the concentrator to align the mirror facets of a parabolic trough solar concentrator. The alignment method is practical and straightforward, and inherently aligns the mirror facets to the receiver. When integrated with clinometer measurements for which gravity and mechanical drag effects have been accounted for and which are made in a manner and location consistent with the alignment method, all of the mirrors on a common drive can be aligned and optimized for any concentrator orientation.

20 Claims, 6 Drawing Sheets

OTHER PUBLICATIONS

J. B. Blackmon et al, "Application of the Digital Image Radiometer to Optical Measurement and Alignment of Space and Terrestrial Solar Power Systems," 28$^{th}$ Intersociety Energy Conversion Engineering Conference Proceedings, IECEC 1993, pp. 2.563-2.570.

R.B. Diver et al, "A New High-Temperature Solar Research Furnace," Journal of Solar Energy Engineering, vol. 105 (1983) pp. 288-293.

M. Shortis et al "Photogrammetry: An Available Surface Characterization Tool for Solar Concentrators, Part II: Assessment of Surfaces", Journal of Solar Energy Engineering, 1997, vol. 119, pp. 286-291.

Richard B. Diver, "Mirror Alignment and Focus of Point-Focus Solar Concentrators" Proceedings of the 1995 ASME/JSME/JSES, International Solar Energy Conference, Maui, HI.

B. L. Butler et al, "Optical Evaluation Techniques for Reflecting Solar Concentrators" SPIE vol. 114 Optics Applied to Solar Energy Conversion (1977), pp. 43-49.

Bridgette J. Steffen et al, "Development and Characterization of a Color 2F Alignment Method for the Advanced Dish Development System", Proceedings of ISEC, International Solar Energy Conference, Hawaii (2003).

Tim Wendelin et al, "Optical Evaluation of Composite-Based Reflector Facets for Parabolic Trough Concentrators", Solar 2004 Conference, Jul. 11-14, Portland, OR, pp. 1-5.

Frank Biggs, et al, "The Helios Model for the Optical Behavior of Reflecting Solar Concentrators" SAND76-0347, 1979.

John A. Duffle et al, "Solar Energy thermal Processes", John Wiley & Sons, Jan. 1, 1974.

Timothy A. Moss et al, "Final Test Results for the Schott HCE on a LS-2 Collector", SAND2005-4034, Jul. 2005.

Richard B. Diver, "Mirror Alignment Techniques for Point-Focus Solar Concentrators", SAND92-0668, Jun. 1992.

Vernon E. Dudley, et al "Test Results SEGS LS-2 Solar Collector" SAND94-1994.

Richard Hartley et al, *Multiple View Geometry in Computer Vision, Second Edition,* Cambridge University Press, 2003, Chapter 10, 3D Reconstruction of Cameras and Structure. pp. 262-278.

* cited by examiner

ALIGNMENT METHOD FOR PARABOLIC TROUGH SOLAR CONCENTRATORS

CROSS-REFERENCE TO RELATED APPLICATION

This application claims the benefit of U.S. Provisional Application No. 60/817,160, filed Jun. 28, 2006, which is incorporated herein by reference.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to solar collectors and, in particular, to alignment methods for parabolic trough solar concentrators that overlays a theoretical projected image on a photographic image of the receiver and adjusts the mirror facets of the trough concentrator until the images coincide.

BACKGROUND OF THE INVENTION

Parabolic trough solar concentrators use mirrored surfaces curved in a parabolic shape. The mirrors focus sunlight on a receiver tube, or heat collection element (HCE), running the length of the trough. In a trough power plant, oil runs through the HCE in the focal region where it is heated to high temperatures and then goes through a heat exchanger to generate steam. The steam is then used to run a conventional power plant. Such parabolic trough solar concentrators have been developed, fielded, and are currently producing electricity in the United States and are in development in other nations. See H. Price et al., "Advances in Parabolic Trough Solar Power Technology," *ASME J. of Solar Energy Engineering* 105, 288 (2002); and V. E. Dudley et al., "Test Results: SEGS LS-2 Solar Collector," *SAND*94-1884, Sandia National Laboratories, Albuquerque, N. Mex. (1994).

Most trough concentrators use multiple mirror facets that have to be aligned to the HCE. Accurate mirror alignment of faceted solar concentrators maximizes the reflected sunlight intercepting the HCE and can enable the use of a smaller HCE, or the use of a larger aperture concentrator with the same size HCE, thereby improving overall collector efficiency. In addition, practical alignment can potentially reduce solar collector installation-fixture accuracy requirements and cost. However, a problem with trough concentrators has been the lack of accurate mirror facet alignment, preventing maximum energy efficiency.

Compared with parabolic dish concentrators, practical optical alignment techniques for the accurate alignment of parabolic trough concentrators have not been developed. The relatively short focal lengths and low operating temperature in parabolic trough systems have allowed them to be developed and commercialized with relatively inaccurate alignment by the use of fixtures. Their linear nature has also been a barrier to the development of practical optical techniques. Parabolic dishes, on the other hand, require precise alignment, especially to minimize flux hot spots on the solar receiver. In addition, the fact that the facet normals of parabolic dishes conveniently point to the same general location (approximately one focal length behind the dish focus) facilitates alignment.

Accurate alignment of concentrating collectors by the use of fixtures is extremely difficult. Error stack-up and indeterminate effects, such as thermal expansion, make the use of fixtures challenging for precise large optical systems. For parabolic dishes, only optical techniques, which inherently account for error stack-up and other factors, have provided the required alignment accuracy. Where optical techniques have been used to measure the alignment of fixture-aligned parabolic troughs, significant misalignment has been reported. Mechanical fixtures also do not lend themselves to checking alignment after installation.

Various optical techniques have been developed to align parabolic dishes. Distant observer and distant light source techniques have been developed to align parabolic dishes, lasers have been used to align solar furnace mirrors and parabolic dishes, and a video-based technique for mirror characterization and facet alignment has been developed and implemented. See F. R. Livingston, "Activity and Accomplishments in Dish/Stirling Electric Power System Development," *DOE/JPL*-1060-82, Pasadena, Calif. (1985); M. K. Selcuk, "Parabolic Dish Test Site: History and Operating Experience," *DOE/JPL*-1060-84, Pasadena, Calif. (1995); R. B. Diver et al., "A New High-Temperature Solar Research Furnace," *ASME J. of Solar Energy Engineering*, Vol. 105, pp. 288-293 (1983); R. B. Diver, "Method and apparatus for aligning a solar concentrator using two lasers," U.S. Pat. No. 6,597,709; and J. B. Blackmon and K. W. Stone, "Application of the Digital Image Radiometer to Optical Measurement and Alignment of Space and Terrestrial Solar Power Systems," Paper No. 93217, *Proceedings of the 28th IECEC*, Atlanta, Ga. (1993). Variations on the distant light source technique have been further developed to enable near alignment and daylight alignment by the use of color targets and video cameras. See R. B. Diver, "Mirror Alignment Techniques for Point-Focus Solar Concentrators," *SAND*92-0668, Sandia National Laboratories, Albuquerque, N. Mex. (1992); R. B. Diver, "Mirror Alignment and Focus of Point-Focus Solar Concentrators," Solar Engineering 1995, *Proceedings of the ASME/JSME/JSES International Solar Energy Conference*, Maui, Hi. (1995); C. E. Andraka et al., "Improved Alignment Technique for Dish Concentrators," *International Solar Energy Conference Proceedings*, Kohala Coast, Hawaii Island, Hi. (2003); and B. J. Steffen et al., "Development and Characterization of a Color 2F Alignment Method for the Advanced Dish Development System," *International Solar Energy Conference Proceedings*, Kohala Coast, Hawaii Island, Hi. (2003). With these techniques, differences between theoretically calculated and optically measured image positions are used to guide alignment.

Despite the relatively advanced state of commercialization of parabolic troughs, optical alignment is undeveloped. One of the early concepts proposed utilizing reflected images in the mirrors, but it was never developed. See R. L. Wood, "Distant Observer Techniques for Verification of Solar Concentrator Optical Geometry", *UCRL*53220, Lawrence Livermore National Laboratory, Livermore, CA (1981). The use of lasers to statistically determine optical accuracy and mirror alignment has received the most attention, and an approach based on stereoscopic photography has shown promise. See T. Wendelin (2004); B. L. Butler and R. B. Pettit, "Optical Evaluation Techniques for Reflecting Solar Concentrators," *SPIE Vol.* 144 *Optics Applied to Solar Energy Conversion*, Society of Photo-Optical Instrumentation Engineers, Bellingham, Wash. (1977); E. Lupfort et al. (2005); and M. R. Shortis and G. Johnston, "Photogrammetry: An Available Surface Characterization Tool for Solar Concentrators, Part II: Assessment of Surfaces," *ASME J. of Solar Energy Engi-* neering, Vol. 119, pp. 281-291 (1997). The distant observer technique has been used to align LS-2 trough facets as part of its HCE performance characterization. See T. A. Moss and D. A. Brosseau, "Final Test Results for the Schott HCE on a LS-2 Collector," *SAND*2005-4034, Sandia National Laboratories, Albuquerque, N. Mex. (2005). Unfortunately, trough spacing requirements do not permit the use of the distant observer technique within a trough field. The laser and stereoscopic techniques are also complex, require sophisticated equipment and setup, and are impractical for the staggering number of mirrors in a trough solar power plant.

A desirable mirror alignment method for any concentrating solar collector would: (1) be simple to set up and implement; (2) use a minimum of sophisticated hardware; (3) not require removal of the HCE receiver; (4) not require sun or other restrictive weather conditions; (5) not require line-of-sight to a distant observer or light source; and (6) permit accessibility to the mirrors for adjustments. See R. B. Diver (1995). The Theoretical Overlay Photographic (TOP) alignment method of the present invention provides these desirable features for aligning parabolic trough solar concentrators.

SUMMARY OF THE INVENTION

The present invention is directed to methods to align a parabolic trough concentrator, preferably but not exclusively comprising providing a line-focusing parabolic trough concentrator module, comprising at least two rows and at least one column of mirror facets, and a linear receiver; providing an alignment fixture comprising one or more off-axis camera positions for each row of the module; positioning the alignment fixture perpendicularly to the trough of the module; determining the boresight offset of the alignment fixture and thereby the locations of the off-axis camera positions; photographing the image of the receiver in a mirror facet with a camera at the off-axis camera position for that mirror facet; calculating a theoretical projected image of the concentrator and the receiver image in the mirror facets as seen by the camera at the off-axis camera position using geometric ray tracing; shifting the theoretical projected image to account for the boresight offset and overlaying the theoretical projected image on the photographic image; and adjusting the mirror facet to bring the photographic image to coincide with the theoretical projected image in the overlay. The alignment steps can be repeated for each mirror facet in each row and column of the module. The boresight offset can be determined using image analysis and photogrammetry techniques, or a boresight gauge and a middle boresight camera. The alignment fixture can be centered to eliminate the boresight offset by bore sighting the middle boresight camera on the receiver and the vertex of the trough concentrator. By not including the image shifting and mirror facet adjusting steps, the method can be used to optically characterize the trough concentrator.

The method can also be used to relatively align a plurality of trough concentrator modules on a common drive, using one of the modules as a reference module. Therefore, the method further comprises determining the relative tilt or twist of at least one additional line-focusing parabolic trough concentrator module on a common drive with the reference module. The relative tilt or twist can be determined by comparing clinometer measurements on the reference module with clinometer measurements on the at least one additional module. The theoretical projected image can then be shifted to compensate for the relative tilt or twist of the at least one additional line-focusing parabolic trough concentrator module and preferably repeating the alignment steps for the mirror facets of the at least one additional line-focusing parabolic trough concentrator module.

The TOP alignment method of the present invention satisfies all of the requirements of a desired alignment process. It uses relatively low technology equipment, inherently aligns the mirrors to the HCE, and can be implemented day or night within the rows of commercial trough power plants. It is also adaptable for use in new installations, mirror replacement, and for characterizing gravity-induced optical errors. Alignment accuracy should be better than the optical accuracy of the mirrors themselves, therefore enabling the best possible optical performance. Accurate alignment of faceted solar concentrators is desirable for achieving full performance potential and is a critical requirement for parabolic dishes. Even for parabolic troughs, accurate mirror alignment helps reduce spillage losses in existing facilities, and can improve the concentration ratio and potentially reduce installation costs in new designs.

BRIEF DESCRIPTION OF THE DRAWINGS

The accompanying drawings, which are incorporated in and form part of the specification, illustrate the present invention and, together with the description, describe the invention. In the drawings, like elements are referred to by like numbers.

DETAILED DESCRIPTION OF THE INVENTION

Figure 1:
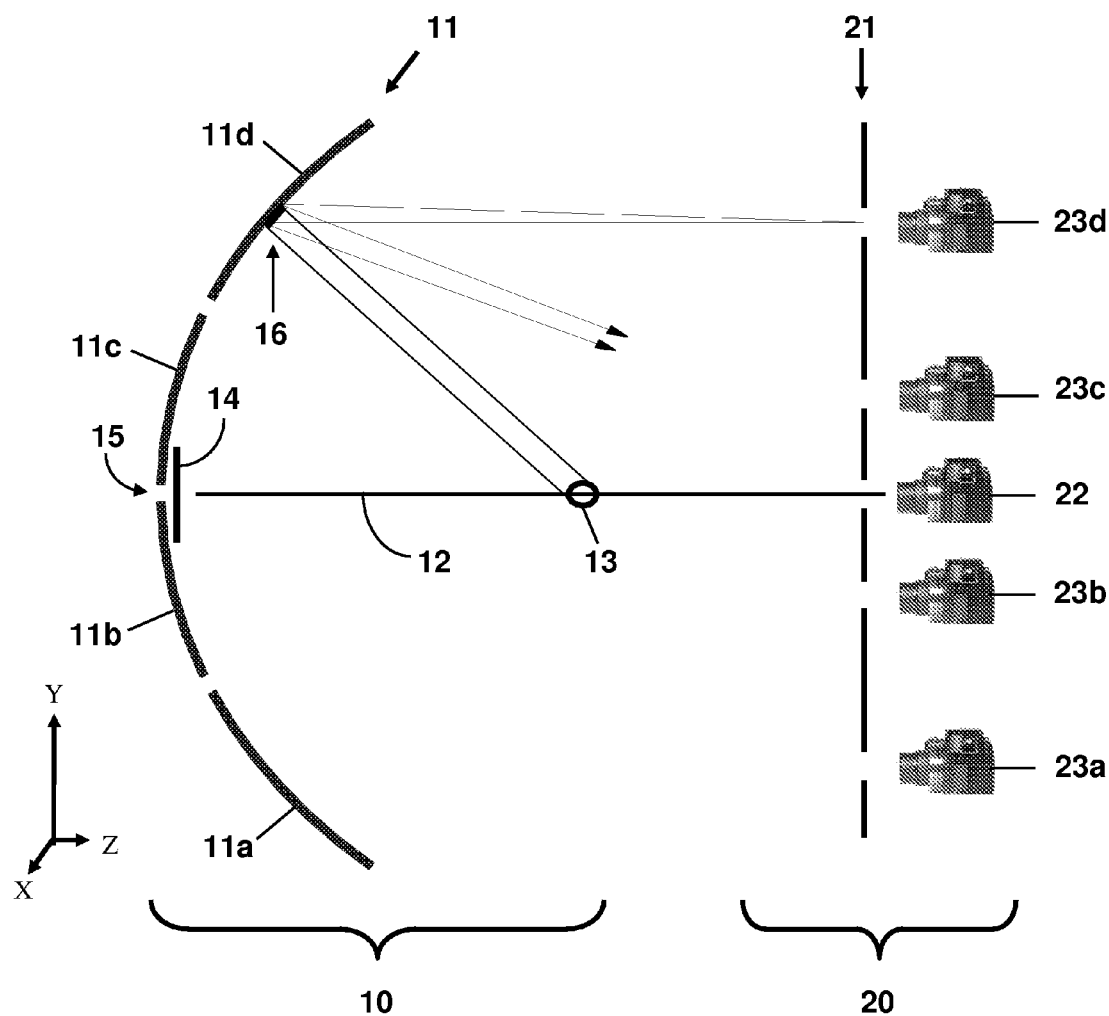
FIG. 1 shows a side-view schematic illustration of the TOP alignment method. Accurately positioned cameras on an alignment fixture measure the position of the HCE receiver image in the mirror. A middle boresight camera can be used to align the fixture, HCE, and trough concentrator. The mirror is aligned to superimpose the HCE image onto the theoretically calculated image position.

In FIG. 1 is shown a side-view schematic illustration of a parabolic collector 10 that illustrates the basic principles of the TOP alignment method of the present invention. The collector 10 comprises a line-focusing parabolic trough concentrator 11 and a linear receiver, or HCE 13. The parabolic axis 12 lies in the z direction, through the vertex 15 of the trough concentrator 11. Elevation is in the vertical y direction. The trough of the concentrator 11 and the length of the HCE 13 run in the horizontal x direction, out of the plane of the figure. The trough concentrator 11 comprises at least two rows of mirror facets.

Each row comprises one or more mirror facets that are arranged serially in the x direction. For example, four rows 11*a-d* of mirror facets are shown in FIG. 1. Adjacent mirror facets in adjacent rows can be arranged in columns. The rows and columns of mirror facets form a concentrator module 11. Light from a source (e.g., the sun) is reflected by the rows 11*a-d* of mirror facets and received by the HCE 13. From basic geometric principles, the shape and location of the reflected HCE image 16 in the mirror facet 11*d* can be theoretically predicted. Alignment is accomplished by adjusting the aim of each of the mirror facets in the rows 11*a-d* so that the actual reflected HCE image 16 falls on the location of the theoretical HCE image for each mirror facet.

An exemplary alignment fixture 20 comprises an on-axis middle camera position 22 and at least one off-axis camera position 23*a, b, c,* and *d* for each row 11*a, b, c,* and *d* of the module 11 (e.g., camera position 23*d* corresponds to mirror row 11*d*). The cameras can be positioned at any location where they can see a reflected image of the HCE in the corresponding mirror facet. Preferably, a camera is positioned in the center of the corresponding mirror to minimize effects due to improper mirror focal length on alignment. For example, the alignment fixture 20 can conveniently be a vertical pole 21 with the cameras and accurately positioned along it at the positions 22 and 23*a-d* (alternatively, a single camera can be moved between camera positions 22 and 23*a-d*). The alignment fixture 20 can be placed at a convenient distance from the concentrator 11. For example, this distance can be close enough to be within the trough rows in a solar power plant, but far enough away so that a camera can see an entire module of mirror facets. The alignment fixture 20 is positioned to be perpendicular to the trough of the concentrator 11. Preferably, the concentrator 11 is positioned horizontally in elevation and the alignment fixture 20 is positioned vertically so that the module 11 points horizontally toward the alignment fixture 20. The concentrator 11 can be positioned horizontally (for example, ±1°) in elevation using open-loop tracking encoder feedback and the alignment fixture 20 can be positioned vertically (for example, ±2°) with levels.

The middle camera 22 can be used to "boresight", or vertically center, the fixture 20 on the collector 10. For example, a boresight gauge 14 can mounted at the vertex 15 of the concentrator module 11 between the inner mirror rows 11*b* and 11*c*, and the middle camera 22 can be bore sighted on the HCE receiver 13 and the vertex 15 by raising or lowering the fixture 20. The boresight gauge 14 can be designed for simple and accurate installation from the ground. The gauge 14 can be graded symmetrically in the ±y direction (for example, by bar coding, gray scale, or color) so that it can be balanced above and below the HCE 13 to position the center of the alignment fixture 20 on the parabolic axis 12 with the HCE 13 and vertex 15. For example, the gauge 14 can comprise a rectangular plate with a long axis in the y direction and having a color center with contrasting color edges. The color center can be sized to just be hidden from the middle camera 22 by the HCE 13 when on axis 12, but can readily be seen when off axis.

After the fixture 20 is aligned, images from the other cameras 23*a-d* can then be used to align the mirror facets in each of the rows 11*a-d* of a column or set of columns. Each camera records the location of the HCE receiver image in each mirror facet in a photographic image. Preferably, the photographic image is a digital image. The HCE image location in the photograph is then compared to a theoretical projected HCE image location by overlaying the two images. Each mirror facet is then adjusted to bring the measured photographic image to coincide with the theoretical projected image in the overlay. If optical errors other than focal length errors exist, photographs at additional camera positions can be used to correct for these errors. After a column or set of columns of mirror facets is photographed, the alignment fixture 20 can be moved to the next column or set of columns of mirror facets in the concentrator module to be photographed. With this method it is possible to make adjustments and observe real time feedback of the relative HCE image and theoretical HCE image locations or to post-process the information and subsequently prescribe adjustments to each mirror mount.

Alternatively, when positioning the fixture 20 with the middle camera 22, it is not necessary to place the middle camera 22 perfectly on axis 12 with the HCE 13 and vertex 15. By the use of a patterned boresight gauge placed at the vertex of the concentrator, the relative y displacement of the middle camera 22 and fixture 20 from the true on-axis location can be determined from simple geometry. This information can be used to determine the boresight offset of the actual location of the middle camera 22 from the on-axis location and the locations of the alignment cameras 23*a-d*. The theoretical overlay images can then modified to account for the boresight offset and the mirrors adjusted accordingly.

Alternatively, it is not necessary to use a middle camera 22 and boresight gauge 14 to determine the boresight offset and/or align the alignment fixture 20. Using image analysis and photogrammetry techniques, the off-axis cameras 23*a-d* can be used to establish the location and orientation of the alignment fixture 20 and the off-axis cameras 23*a-d* relative to the parabolic axis 12. Because the trough geometry is well known and multiple cameras have overlapping fields of view, it is possible to accurately determine fixture location by applying multiple view geometry techniques. See, e.g., R. Hartley and A. Zisserman, Multiple View Geometry in Computer Vision, Cambridge University Press, Cambridge, UK (2003). Alternatively, by comparing the relative number of pixels between the top receiver edge and the top edge of the module with the number of pixels between the bottom receiver edge and the bottom edge of the module in the boresight camera, the fixture y location can be determined.

Conversely, rather than use the above method for mirror alignment, the comparison of the theoretical and photograph images locations at multiple known y locations can also be used to characterize the optics of the trough, including alignment errors, slope errors, and other optical errors. The difference between the theoretical receiver image edge location and the photograph receiver image edge location indicates a quantifiable optical error corresponding to the receiver image location. By taking images at multiple known offsets across the full extent of the mirrors, the optical errors in the y direction can be quantified across the mirrors. Multiple cameras per row of mirrors or simply raising and lowering the fixture by measurable amounts and acquiring images can be used to acquire multiple y location images per mirror.

A solar collector assembly (SCA) of a trough power plant can comprise a plurality of trough concentrator modules (typically, six to twelve) on a common drive. For good optical performance of the SCA, it is necessary that the individual modules be pointed in parallel alignment with each other. The TOP alignment method as described above aligns all of the mirror facets in a module to the HCE. It does not guarantee all of the modules on a drive are aligned with each other. However, by measuring relative module misalignment with clinometers, the present invention allows for all of the mirrors on a common drive to be aligned to the HCE, optimized for any specific orientation.

A clinometer can be used to measure the angle of slope (tilt) of each module with respect to gravity. By measuring the relative tilts of the modules on the drive with a clinometer, the relative alignment of all of the modules on the common drive can be determined. Further, by utilizing a clinometer mounted between the HCE receiver and concentrator vertex (between the inner two mirrors), and placing the clinometer fixture in the same location and manner as the boresight gauge, the clinometer can measure relative module alignment utilizing the same geometric reference as the TOP mirror facet alignment. The relative module misalignment and mirror facet alignment can then be simultaneously corrected by adding the relative module adjustment to the theoretical overlays of the mirror facets for each module. For example, if a module is misaligned relative to the reference module by 4 milliradians to the east, the theoretical overlay HCE image location for that module can be shifted 4 milliradians to the west to compensate. The reference module can be a specified module, for example, one adjacent to the drive. Alternatively, adjustments can be made relative to the average relative module tilt. In addition, by characterizing relative twist of modules for a SCA with multiple clinometers on fixtures as functions of orientation, it is possible to account for gravity, bearing, receiver flex hose, or receiver rotating joint drag on relative module alignment (twist) and compensate relative module alignment accordingly. With this method, it is possible to align the array of modules and mirrors in the modules for any specific orientation, such as for the zenith (concentrator pointing straight up). Furthermore, because the TOP alignment inherently aligns to the HCE, variations in HCE location can be accounted for.

Calculation of the Theoretical Projected HCE Image

Ray tracing from a camera position, to a mirror facet, and then to the edges of the HCE can be used to calculate the theoretical location of the HCE image in the mirror facet and then draw a graphical projection of the image and mirrors as seen by the camera. The equations presented below are based on vector methods used in analytic geometry and are variations on equations used for the alignment of parabolic dishes. See R. B. Diver (1992) and R. B. Diver (1995).

Figure 2:
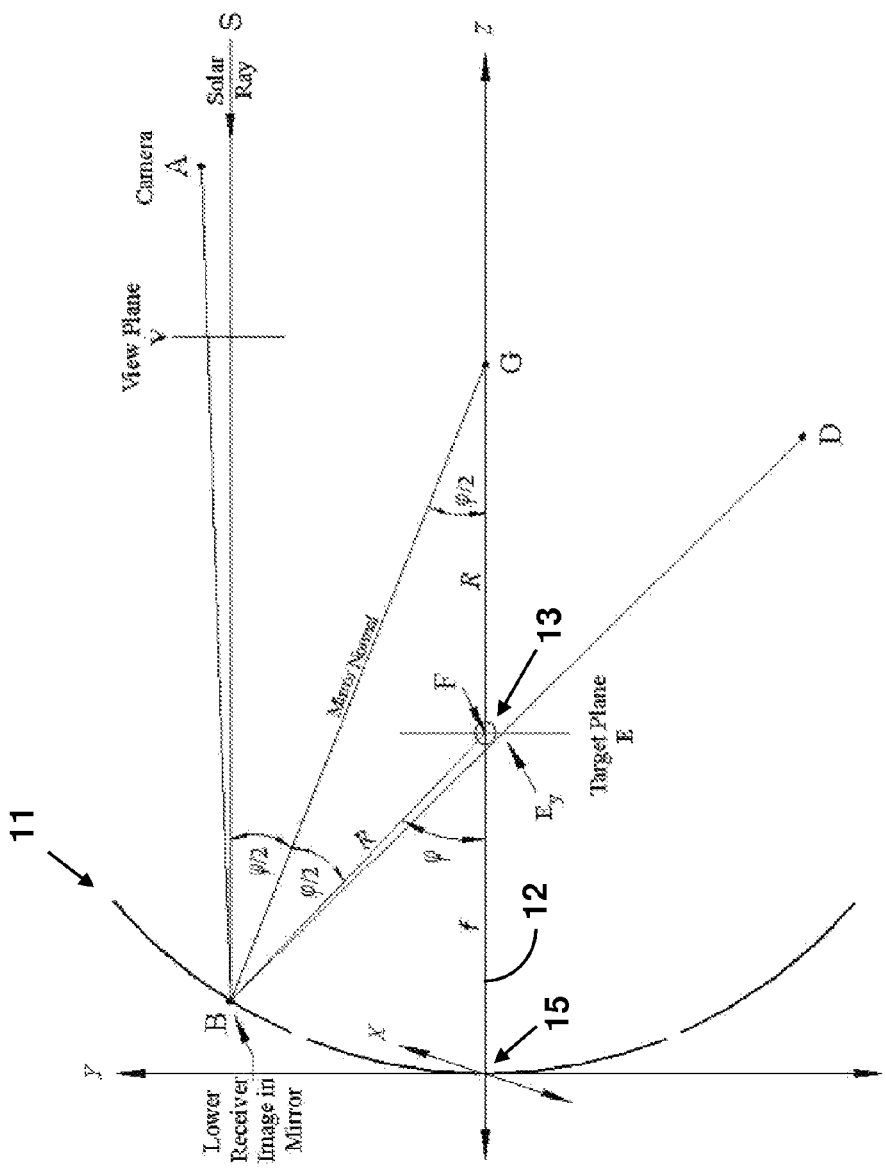
FIG. 2 shows a schematic illustration of the coordinate system and locations of the mirror, HCE, target, focus, camera, and the solar rays for calculating the lower HCE edge position in the mirrors.

Consider the coordinate system illustrated in FIG. 2. Alignment errors along the x-axis are not considered since the reflected rays still intercept the HCE receiver 13. Because the trough 11 has no curvature along the x-axis, the theoretical image of the HCE 13 is straight along the x-axis and the y and z image locations along the mirror rows are constant. Therefore, to determine the theoretical image location as viewed from an off-axis camera A, it is convenient to consider only the z and y vector components. In FIG. 2, the parabola vertex 15 is the origin and the x-axis is perpendicular to the plane of the figure. The focal line of the parabola is represented by a point F. For a parabolic concentrator, the vertex 15 can be defined as the middle of the trough 11, i.e., the intersection of a vertical line through the middle of the center column of mirror facets and the horizontal line along the parabola vertex (x-axis). The z-axis is the optical axis 12 of the trough concentrator 11. A mirror location in space, B, is given by its coordinates ($B_x$, $B_y$, $B_z$); and the linear HCE 13 is parallel to the x-axis and perpendicular to the z-axis.

Utilizing the characteristics of the parabola, FIG. 2 shows that for a solar ray to be reflected from the sun S to the focus F, the mirror normal for a perfect parabola (vector BG) must bisect the angle SBF in the z-y plane, and the distance between points F and G is equal to the distance between points B and F. This relationship is true for all mirror positions B. Point G is at the intersection of the facet normal and the z-axis and is different for each mirror y-position.

When calculating the corrected HCE image location to account for relative module tilt, the mirror normal is modified by adding the clinometer-determined adjustment to the mirror normal vector BG.

Useful equations for a parabola applied to the coordinate system in FIG. 2 are $$B_z = B_y^2 / 4f \text{ and} \quad (1)$$

$$R = 2f/(1 + \cos \phi), \quad (2)$$

where $f$ is the parabola focal length, R is the distance from the parabola to the focus in the z-y plane, and $\phi$ is the mirror position angle. See J. A. Duffie and W. A. Beckman, *Solar Energy Thermal Processes*, John Wiley & Sons, New York, N.Y., Chap. 8 (1974).

To determine the location of the image of the HCE lower receiver edge in the mirror facet B as seen by the camera A, the reflected vector BD from the mirror tangent to the bottom edge of the HCE receiver 13 can be iteratively calculated using the vector BA from the camera A to the mirror B and the mirror normal vector BG by the use of the following vector mathematics equation:

$$BD = 2 \left[ \frac{BA \cdot BG}{BG \cdot BG} \right] BG - BA \quad (3)$$

where the x, y, and z components of vectors BA and BG are $$BA_x = A_x - B_x, \ BA_y = A_y - B_y, \ BA_z = A_z - B_z, \text{ and} \quad (4)$$

$$BG_x = G_x - B_x, \ BG_y = G_y - B_y, \ BG_z = G_z - B_z, \text{ respectively.} \quad (5)$$

The dot products in Eq. (1) are $$BA \cdot BG = BA_x \times BG_x + BA_y \times BG_y + BA_z \times BG_z, \text{ and} \quad (6)$$

$$BG \cdot BG = BG_x \times BG_x + BG_y \times BG_y + BG_z \times BG_z. \quad (7)$$

Eq. (3) is based on the law of reflection and has been derived for unit vectors by Biggs and Vittitoe. See F. Biggs and C. N. Vittitoe, "The Helios Model for the Optical Behavior of Reflecting Solar Concentrators," *SAND*76-0347, Sandia National Laboratories, Albuquerque, N. Mex. (1976). Note that vector BD, from Eq. (3), has the same magnitude as vector BA and that every mirror point along the theoretical parabola B has a unique mirror normal BG that can be determined from the characteristics of a parabola as discussed above.

The location of where vector BD intersects the target plane E (the plane through the center of the receiver 13 perpendicular to the z-axis) corresponding to the bottom edge of the receiver is point $E_y$, and can be calculated by scaling the y component of vector BD in accordance with the z component, which is known. The scale factor between vector BE and vector BD, M, is therefore $$M = \frac{E_z - B_z}{D_z - B_z}, \quad (8)$$

and the y-coordinate at the target plane E, is $$E_y = B_y + M(D_y - B_y). \quad (9)$$

With this set of equations, the location on a mirror (point B) corresponding to where the reflected ray BD intersects the edge of the receiver can not be explicitly solved. It requires an iterative solution to find the mirror position B such that vector BD is tangent to the receiver. Furthermore, because a HCE receiver has a circular cross section (for this example), the effective y-location corresponding to where vector BD is tangent to the receiver depends on the angle in the z-y plane of vector BD. For the lower receiver edge image the effective target plane y-location $E_y$ is $$E_y = -r/\cos(\phi + r/R), \tag{10}$$

where r is the HCE tube radius. R is the distance from the mirror B to the focus F in the zy plane from Eq. (2). For the upper receiver image, the effective target plane y-location $E_y$ is $$E_y = r/\cos(\phi - r/R). \tag{11}$$

The above equations when iteratively solved determine the y-location on the mirror $B_y$ corresponding to the bottom and top edge of the receiver as seen from the camera A. Because the parabolic trough has no curvature along the x-axis, the theoretical image of the receiver is straight along the x-axis. Assuming the receiver length is the same as the concentrator length, the theoretical x locations in the mirrors corresponding to receiver ends can also be iteratively calculated. Solving the above equations for both sides and ends of the receiver gives the theoretical edge locations on the mirrors of the reflected image as seen by the camera A of perfectly aligned parabolic mirror facets.

The theoretical overlay is the calculated two-dimensional projection of the mirrors and theoretical receiver image (determined above) as seen by a camera at point A. Projection theory is used to calculate what a camera would see for a perfectly aligned mirror. In a camera, the projected image is inverted through lenses onto a detector. For this analysis, the mirror corner coordinates and receiver image corner coordinates are projected onto a view plane V between the camera A and mirror B. Because the theoretical image and photograph when overlaid are scaled to match dimensionally, the view plane position (and therefore the size of the theoretical overlay) is not important. In FIGS. 1 and 2 the camera is shown pointed parallel to the z-axis and perpendicular to the view plane V. In this case the x and y coordinates for the image and mirror facet corners in the view plane V can be calculated by simply scaling the x and y image and mirror coordinates to the relative z-component distances between the camera to view plane vector and camera to facet or image point vectors. If the camera is pointed elsewhere, such as the parabola vertex, it is convenient to use Cartesian/cylindrical coordinate transformations to align the camera and view plane axis with the transformed z-axis to scale the view plane coordinates.

Alignment of an LS-2 Parabolic Trough Solar Concentrator

Figure 3:
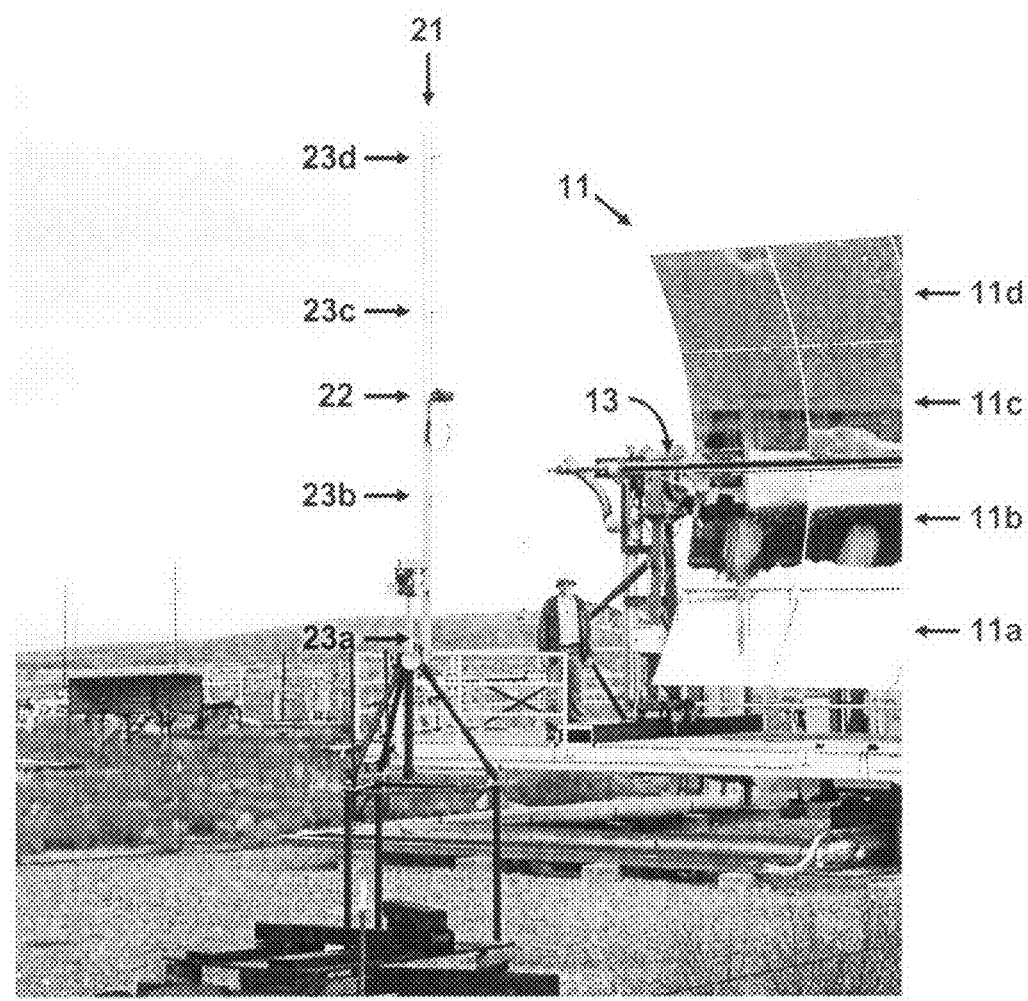
FIG. 3 shows a photograph of an exemplary alignment fixture and LS-2 trough concentrator on the rotating platform at the NSTTF. The camera is mounted at the middle boresight position.

In FIG. 3 is shown a photograph of an LS-2 parabolic trough solar concentrator 11 and an exemplary alignment fixture 21 at the National Solar Thermal Test Facility (NSTTF) in Albuquerque, N. Mex. The concentrator 11 is on a rotating platform to facilitate collector performance measurements. The LS-2 trough concentrator is one of three LUZ concentrator designs fielded at the nine Solar Electric Generation Systems (SEGS) power plants in southern California. The LS-2 concentrator features a central torque tube and truss mirror supports. A concentrator module consists of 20 thermally-slumped, parabolic-contoured, low-iron, back-silvered glass mirrors and two heat collection elements. The aperture is 5 meters rim-to-rim and is nearly 8-meters wide. See H. Price et al. and V. E. Dudley et al.

The exemplary alignment fixture 21 comprised a heavy-duty tripod on which a 2.5 cm×7.5 cm (1×3 inch) aluminum rectangular tube was mounted. Aluminum Unistrut® channel and five angle brackets provided adjustable camera position mounts. The camera shown in FIG. 3 is mounted at the boresight middle camera position 22. A Nikon D70 digital camera with an 18-70 mm focal length lens was used. The alignment fixture 21 was placed at approximately 10.4 meters (34 ft) from the trough concentrator 11. At this distance, the camera field of view covered the entire module at a focal length setting of 26 mm. At focal length settings of less than about 22 mm, needed to see the entire module at less than about 8 meters (26 feet), fisheye distortion of the image was detectable. For these tests, one camera position was used per mirror row. Inner row camera positions 22b and 22c were 0.729 m from the middle camera position 22 and the outer camera positions 22a and 22d were 1.970 m from the middle position 22. These positions corresponded to the mirror facet center location for each row 11a-d, which minimized the effect of facet focal length variations on alignment. Care was taken to accurately locate the camera focus at the prescribed positions. For most of the tests, the camera was sighted parallel to the z-axis by visually framing the module and aiming at the center of the corresponding row. Other tests were performed with the cameras pointed toward the trough vertex with consistent results.

The trough concentrator 11 was pointed horizontally towards the alignment fixture 21. The trough concentrator 11 was positioned horizontally (±1°) in elevation using its open-loop tracking encoder feedback and the fixture 21 was positioned vertically (±2°) with levels. Using boresight gauges mounted between the inner mirror rows 11b and 11c, the middle camera 22 was bore sighted on the HCE receiver 13 and vertex of the concentrator 11 by raising and lowering the fixture 21. Images from the other four camera positions 22a-d were then used to align the five mirror facets in each of the four rows in the module. Each camera recorded the location of the reflected image of the HCE 13 in each mirror in a digital photographic image. The reflected image location in the photograph was then compared to the theoretical projected image location by overlaying the two images. The difference between the theoretical and photographed reflected image edge locations as seen by the camera was used to measure the vertical component of mirror slope error magnitude and direction for each corresponding image pixel location in the mirror. Mirror facets were then adjusted to bring the photographic image to coincide with the theoretical projected image in the overlay. The mirror aim was adjusted by adding shim washers between the mirror facet and mounting frame until the images visually coincided. By taking images at multiple locations per row, this method can be used to optically characterize individual mirror facets or mirrors on modules with high spatial resolution.

During the proof-of-concept testing, all of the mirror alignment shim washers were removed and the module was characterized with both the TOP alignment method of the present invention and the distant observer technique. For the distant observer, rather than aiming the trough by maximizing the amount of black seen in the mirrors, the trough was bore sighted to the HCE using boresight gauges similar to those used to boresight the camera fixture as described above. The TOP alignment method was then used to determine which mounts needed shim washers. After three iterations the module was aligned.

Figure 4A:
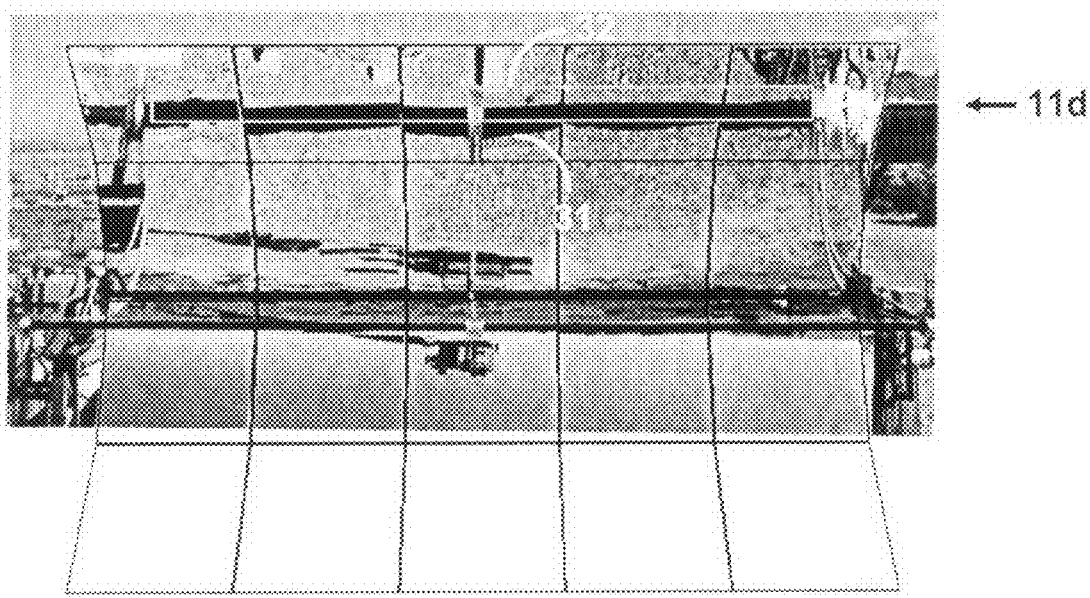
FIG. 4 shows a theoretical overlay photograph of the LS-2 upper outer row before (FIG. 4A) and after (FIG. 4B) TOP alignment. Alignment is accomplished by adding shim washers on the side of the mirror facet in the direction the image needs to be moved.
Figure 4B:
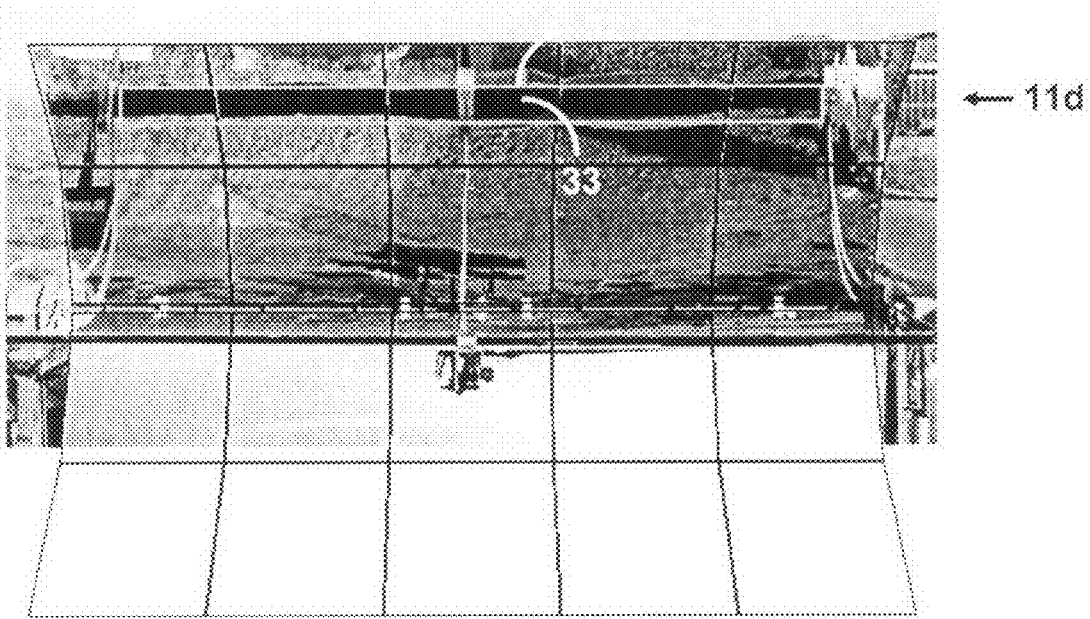
Figure 5A:
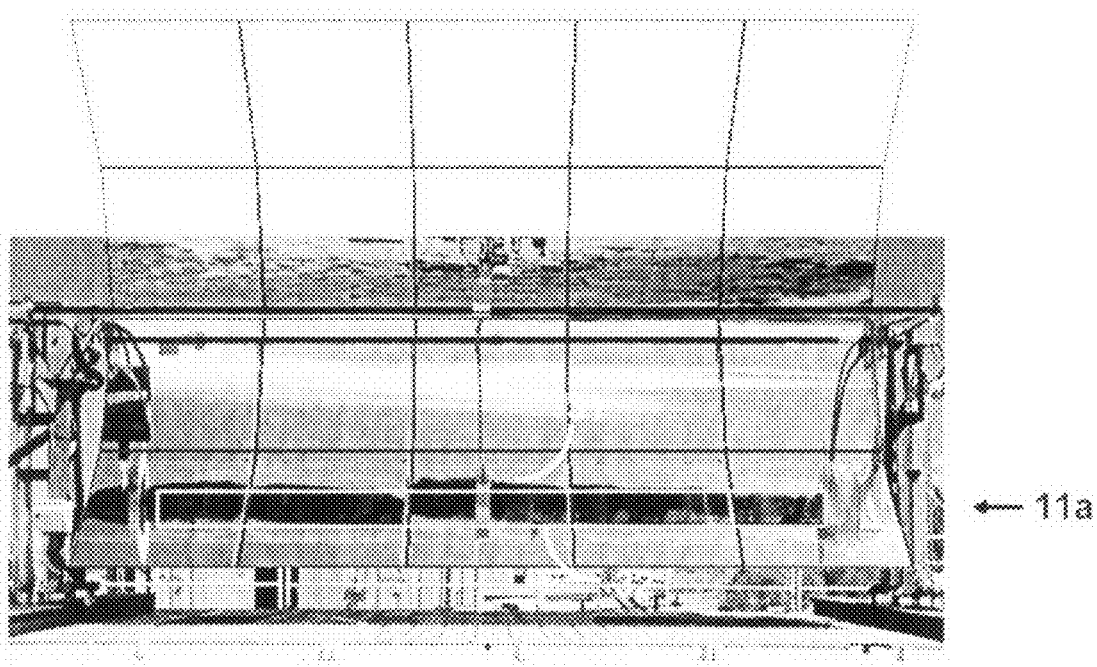
FIG. 5 shows a theoretical overlay photograph of the LS-2 bottom outer row before (FIG. 5A) and after (FIG. 5B) TOP alignment. The TOP alignment called for more shims on the left side than the right side of the middle mirror to correct the slanted image.
Figure 5B:
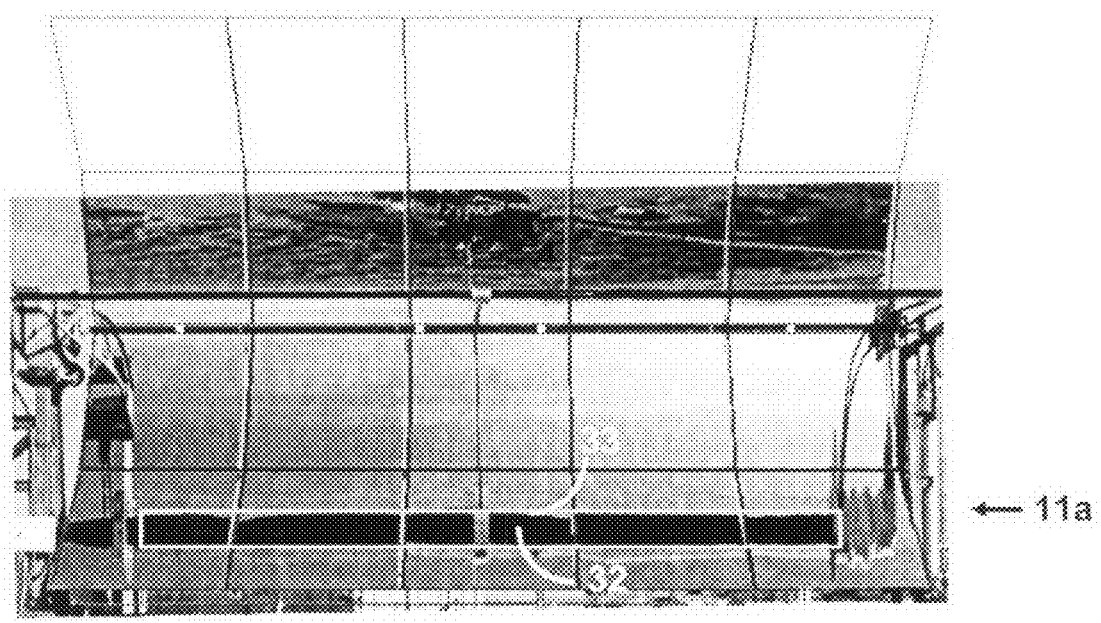

In FIGS. 4 and 5 are shown two sets of image overlays before (FIGS. 4A and 5A) and after (FIGS. 4B and 5B) alignment of the upper and bottom outer rows 11d and 11a, respectively, of the LS-2 trough concentrator. As can be seen from FIGS. 4A and 5A, the camera photographic image 31 of the HCE receiver does not coincide with the overlaid theoretical projected image 32 before alignment. As can be seen from FIGS. 4B and 5B, the theoretical projected image 32 accurately coincides with the camera photographic image 33 of the receiver in the aligned concentrator. Even with the limited-capability image overlay software used in these tests, repeatable and precise alignment was obtained.

Figure 6A:
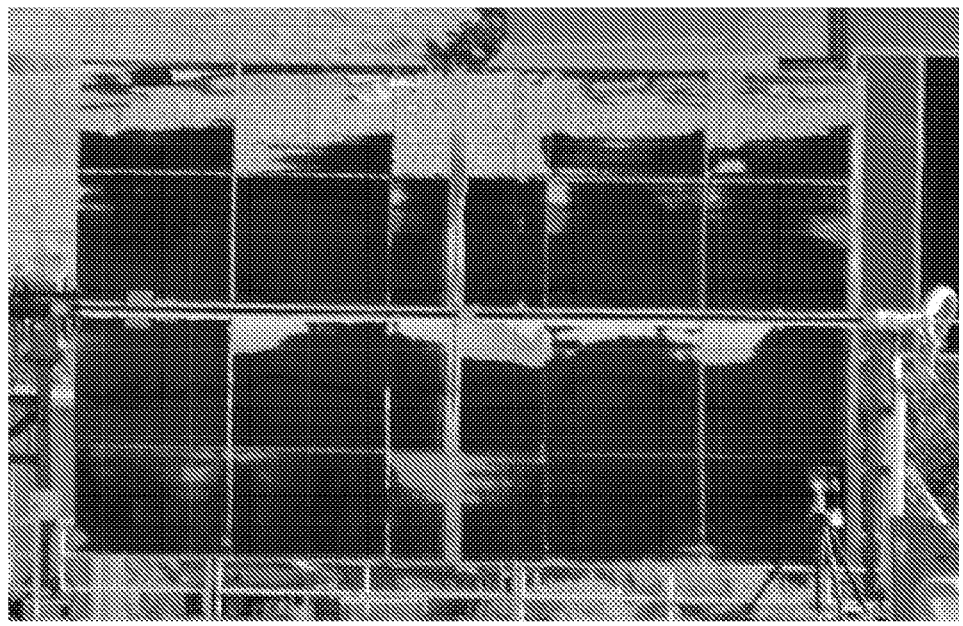
FIG. 6 shows distant observer photographs of the LS-2 module at the NSTTF prior to (FIG. 6A) and after (FIG. 6B) TOP alignment. Because the bottom mirror rows reflect the sky and the top mirror rows reflect the ground, misaligned regions appear blue on the bottom and brown on top. The distance from the camera to the trough vertex was approximately 460 meters (1507 feet).
Figure 6B:
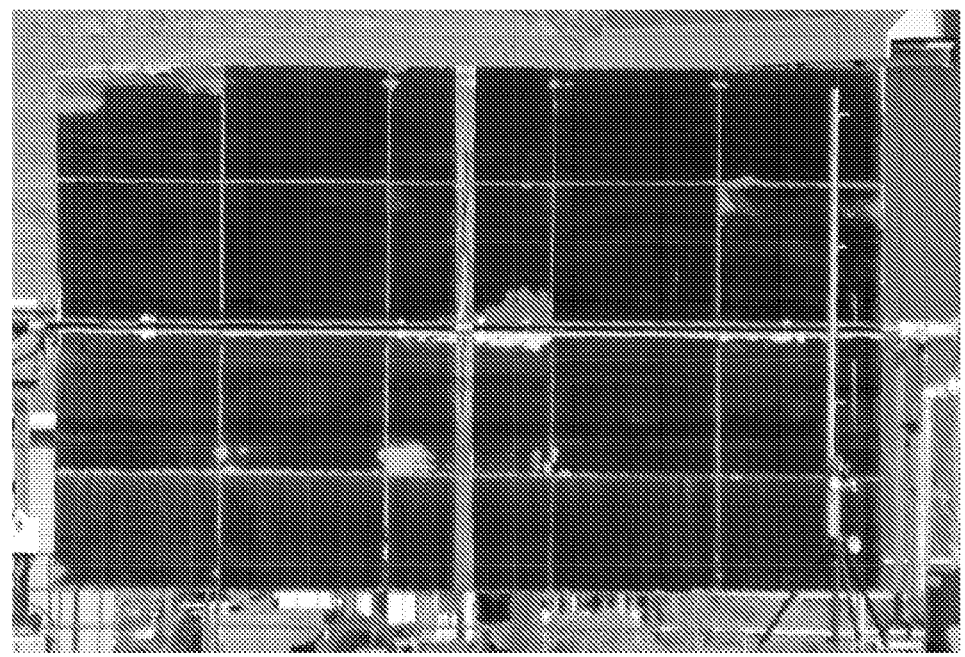

In FIG. 6 are shown distant observer photographs before (FIG. 6A) and after (FIG. 6B) alignment of the LS-2 trough using the TOP alignment method. Nearly perfect distant observer alignment was obtained with the TOP alignment method. As can be seen by comparing the theoretical overlay photographs in FIGS. 4A and 5A with the distant observer photograph in FIG. 6A, correlation between the two methods is very good.

It is important to note that the NSTTF LS-2 trough concentrator as assembled met design specifications. Therefore, FIG. 6A suggests the inadequacy of using mechanical fixtures alone to accurately align mirrors. The TOP alignment method accommodates the four-point mounts utilized on the LS-2 trough concentrator. For example, the middle mirror facet in FIG. 5A clearly shows a slanted HCE image before alignment. This misalignment was readily accommodated by adding more spacers to the left side than the right of the facet to provide the aligned middle facet in FIG. 5B.

Various tests were conducted to determine repeatability and error sensitivity. Testing established that the boresight position was easily repeatable within ±5 mm and that overlay results are repeatable day-to-day. The effect of the concentrator module being rotated around the y-axis relative to the fixture by rotating the platform 5 degrees was also evaluated. Although this rotation distorted the image relative to the theoretical overlay (the photograph appeared large on one side and small on the opposite side), because the theoretical image was still centered in the facets, good estimates of needed adjustments may still be made. For the same reason, results were also insensitive to the distance from the camera to the trough concentrator within approximately ±0.5 m (1.6 feet). Testing also showed minimal structural deflections when the LS-2 trough was rolled over to point in the opposite direction. Image movements from shim washer thicknesses corresponding to approximately 2 milliradians (mrad) of tilt were readily detectable. The testing showed the alignment method had enough resolution to accommodate half-thickness (1 mrad) washers for even more precise alignment.

A field deployment alignment fixture may utilize carefully mounted and adjusted fixed video cameras, image processing and analysis software, and a truck- or trailer-mounted self-leveling fixture. For bore sighting, an electric actuator may raise and lower the fixture. For large-scale commercial applications, a trailer-mounted camera fixture may be towed between rows. Surveying technology like that used to plow straight rows for agriculture or ultrasonic distance measurement devices may establish the correct distance to the trough row being aligned. A field crew may install and remove survey guides and boresight gauges while a driver and optical technician may guide the fixture trailer until the middle camera is centered horizontally on a module. After raising or lowering the fixture to boresight the middle camera on axis with the HCE and trough module and checking the verticality of the fixture, images may be taken and stored in a database. By careful design of the boresight gauge, it is not necessary to precisely boresight the fixture, thereby minimizing the amount of time needed for alignment. Leveling of the fixture can be automated utilizing clinometers and drive mechanisms on the two axes of the fixture. The fixture may then be driven to the next module and the process repeated. With fast image acquisition and continuous leveling of the fixture, it is possible to characterize trough mirror alignment without having to stop. The images may be processed later and work orders detailing alignment adjustments may be created. Alignment adjustments may be made when convenient, perhaps even while the plant is operating. As deemed necessary for quality assurance, additional measurements to ensure proper mirror alignment may be made. A possibility for new installations is to stencil theoretical image lines on the mirrors themselves, thereby allowing the installation crew to align the facets during installation from video images.

Alignment Error Analysis

There are three primary sources of error that affect alignment accuracy with the TOP alignment method of the present invention: (1) mirror location errors, (2) image location errors, and (3) target location errors. Mirror location errors refer to differences between the theoretical mirror location and its actual location. Image location errors refer to errors in centering the photographic image on the theoretical image, and target location errors are errors in positioning the target and camera(s) relative to the concentrator.

Because the HCE receiver serves as the target, and the cameras, HCE, and mirrors are bore sighted together, errors associated with the target location are minimized. For example, it is possible that the HCE may not be positioned straight (parallel to the x-axis in the y-direction). However, because the TOP alignment inherently aligns to the HCE this is not important for accurate alignment. Similarly, correct positioning of the HCE in the z-direction is also not critical. It is also possible that HCE position may be offset from the trough optical axis. Large or asymmetric mirror mount adjustments may serve as flags to check for gross HCE offsets. The HCE borosilicate glass envelope refracts the image of the receiver and causes it to appear slightly smaller. This effect has no impact on alignment.

Table 1 is a summary of estimated uncertainties that can contribute to alignment errors with the alignment method. These are 95% confidence estimates of what is reasonably achievable in the field extrapolated from experience with the LS-2 alignment testing described above using moderate resolution video cameras (nominally 2 mega pixel resolution assuming ±2 pixel accuracy). Uncertainties are expressed in terms of displacement (mm) of the HCE image on the mirrors. For example, if the mirror position is off in the x-direction (along the length of the trough) there are no alignment uncertainty consequences. However, if it is off in the y-dimension by ±4 mm, uncertainties of ±4 mm result in where the HCE image is seen in the inner and outer mirrors. Mirror position errors in the z-direction only affect the focal distance and have no impact on alignment since the receiver image is still centered in the mirror. Uncertainties were determined by calculating the difference between the theoretical image position with and without errors.

TABLE 1

Estimated Image Position Uncertainties for LS-2 Trough Concentrator TOP Alignment

| Error | Inner Row Uncert. (± mm) | Outer Row Uncert. (± mm) |
|---|---|---|
| Mirror Position, x (±4 mm) | 0 | 0 |
| Mirror Position, y (±4 mm) | 4 | 4 |
| Mirror Position, z (±4 mm) | 0 | 0 |
| Overlay Image Position, y (±10 mm) | 10 | 10 |
| Image Position, y (±8 mm) | 8 | 8 |
| Bore Site Position, x (±50 mm) | 0 | 0 |
| Bore Site Position, y (±5 mm) | 5 | 5 |
| Bore Site Position, z (±50 mm) | 0 | 0 |
| Camera Position, y (±2 mm) | 2 | 2 |
| Trough/Fixture Perpendicularity (±3 deg.) | 1 | 3 |
| Total mirror position uncertainty (mm) | 30 | 32 |
| Total root-sum-square uncertainty (mm) | 14.5 | 14.8 |

Sensitivity of the image position to facet misalignment was similarly evaluated by introducing nominal alignment errors and then evaluating the position of the resulting theoretical image. For a nominal misalignment error of 2 mrad, the resulting displacement of the theoretical image is 21 mm/mrad on the outer row mirrors and 18 mm/mrad on the inner row mirrors. The overall additive alignment uncertainty from Table 1 is, therefore, conservatively less than 2 mrad for both the inner and outer row mirrors. If the uncertainties in Table 1 are representative of a 95% confidence, then the 2 mrad additive alignment uncertainty estimate is greater than 2 standard deviations and the alignment error standard deviation is better than 1 mrad. Because the root-mean-square (RMS) slope errors of the LS-2 mirrors are greater than 2 mrad, there is little to be gained by improving on the accuracy of this method. See T. Wendelin and R. Gee, "Optical Evaluation of Composite-Based Reflector Facets for Parabolic Trough Concentrators," *Proceedings of Solar* 2004 *Conference*, ISES 04, Portland, Oreg. (2004).

Structural deflections of the HCE and mirrors between the alignment position and tracking can introduce alignment errors. If the deflections and their effect on alignment can be determined, it is possible to "bias align" the mirrors for any specified orientation by introducing deflection compensation adjustments into the overlays. Special structural deflection tests in which the fixture is supported above the trough can be used to validate structural/optical analysis models, measure gravity induced optical errors, and calculate overlay biases. An assumption in the error analysis is that mirror slope errors are random normal in nature. Because sampling is spatially limited to the center region of the mirrors (mirror locations corresponding to the edges of the HCE receiver image as seen by the camera), if the mirror has systematic slope errors alignment can be skewed. The most general systematic error is focal length errors. Sampling the center region of the mirror minimizes alignment errors caused by facet focal length variations. The width of the HCE image in the mirrors provides a measure of facet focal length. The size of the reflected image was used to focus stretched-membrane facets on the Cummins Power Generation CPG-460 dish concentrator, and to measure focal length of the ADDS mirrors. See Diver (1995) and Andraka et al. (2003). Other systematic errors are also possible.

Although laser ray-trace data show that systematic errors exist on LS-2 type mirrors, they indicate that sampling the center of the mirror is a good location. See Wendelin (2004). These proof-of-concept results also suggest that systematic slope errors are not an issue. If needed, the use of bias alignment approaches or additional camera positions can be used to address systematic slope errors.

The present invention has been described as a theoretical overlay photographic alignment method for parabolic trough solar concentrators. All references listed above are hereby incorporated by reference. It will be understood that the above description is merely illustrative of the applications of the principles of the present invention, the scope of which is to be determined by the claims viewed in light of the specification. Other variants and modifications of the invention will be apparent to those of skill in the art.

I claim:

1. A method to aligning a parabolic trough solar concentrator, comprising:
    (a) providing a line-focusing parabolic trough concentrator module, comprising at least two rows and at least one column of mirror facets, and a linear receiver;
    (b) providing an alignment fixture comprising at least one off-axis camera position for each row of the module;
    (c) positioning the alignment fixture perpendicularly to trough of the module;
    (d) determining the boresight offset of the center of the alignment fixture and thereby the locations of the off-axis camera positions;
    (e) photographing the image of the receiver in a mirror facet with a camera at the off-axis camera position for that row of mirror facets;
    (f) calculating a theoretical projected image of the concentrator and the receiver image in the mirror facet as seen by the camera at the off-axis camera position using geometric ray tracing;
    (g) shifting the theoretical projected image to account for the boresight offset and overlaying the theoretical projected image on the photographic image; and
    (h) adjusting the mirror facet to bring the photographic image to coincide with the theoretical projected image in the overlay.

2. The method of claim 1, further comprising repeating the mirror facet alignment steps (d) to (h) for each mirror facet in each row of the module.

3. The method of claim 1, further comprising repeating the mirror facet alignment steps (d) to (h) for each mirror facet in each column of the module.

4. The method of claim 1, wherein positioning step (c) comprises positioning the module horizontally in elevation and the alignment fixture vertically so that the module points horizontally toward the alignment fixture.

5. The method of claim 1, wherein the boresight offset at step (d) is determined using image analysis and photogrammetry techniques.

6. The method of claim 1, wherein the boresight offset at step (d) is determined using a boresight gauge and a middle camera at the center of the alignment fixture.

7. The method of claim 1, wherein the boresight offset is eliminated by centering the alignment fixture on the receiver and the vertex of the trough concentrator module, thereby eliminating the shifting step (g).

8. The method of claim 7, wherein the boresight offset is eliminated by bore sighting the middle camera on the receiver and the vertex of the trough concentrator module.

9. The method of claim 1, wherein the line-focusing parabolic trough concentrator module is a reference module and the method further comprises determining the relative tilt of at least one additional line-focusing parabolic trough concentrator module on a common drive with the reference module.

10. The method of claim 9, wherein the relative tilt is determined by comparing a clinometer measurement on the reference module to a clinometer measurement on the at least one additional module.

11. The method of claim 10, wherein a clinometer is mounted between the receiver and module vertex in the same location and manner as the boresight gauge for that module so that the clinometer can measure relative module alignment utilizing the same reference as is used for the mirror facet alignment of that module.

12. The method of claim 9, further comprising shifting the theoretical projected image to compensate for the relative tilt of the at least one additional line-focusing parabolic trough concentrator module and repeating steps (d) to (h) for each mirror facet of the at least one additional line-focusing parabolic trough concentrator module.

13. The method of claim 9, further comprising determining the relative twist of the at least one additional line-focusing parabolic trough concentrator module.

14. The method of claim 13, wherein the relative twist is determined by comparing a clinometer measurement on the reference module with two or more clinometer measurements on the at least one additional module.

15. The method of claim 13, further comprising shifting the theoretical projected image to compensate for the relative twist of the at least one additional line-focusing parabolic trough concentrator module and repeating steps (d) to (h) for each mirror facet of the at least one additional line-focusing parabolic trough concentrator module.

16. The method of claim 13, wherein a clinometer is mounted between the receiver and module vertex in the same location and manner as the boresight gauge for that module so that the clinometer can measure relative module alignment utilizing the same reference as is used for the mirror facet alignment of that module.

17. A method to optically characterizing a parabolic trough solar concentrator, comprising:
(a) providing a line-focusing parabolic trough concentrator module, comprising at least two rows and at least one column of mirror facets, and a linear receiver;
(b) providing an alignment fixture comprising one or more off-axis camera positions for each row of the module;
(c) positioning the alignment fixture perpendicularly to the trough of the module;
(d) determining the boresight offset of the center of the alignment fixture and thereby the locations of the off-axis camera positions;
(e) photographing the image of the receiver in a mirror facet with a camera at the off-axis camera position for that mirror facet;
(f) calculating a theoretical projected image of the concentrator and the receiver image in the mirror facets as seen by the camera at the off-axis camera position using geometric ray tracing; and
(g) comparing the photographic image to the theoretical projected image.

18. The method of claim 17, further comprising repeating the mirror facet characterization steps (d) to (g) for each mirror facet in each row of the module.

19. The method of claim 17, further comprising repeating the mirror facet characterization steps (d) to (g) for each mirror facet in each column of the module.

20. The method of claim 17, wherein positioning step (c) comprises positioning the module horizontally in elevation and the alignment fixture vertically so that the module points horizontally toward the alignment fixture.

* * * * *